INVENTORS.
GORDON B. SORLI and
SERGIO CALDERON
BY Peter Xiarhos
AGENT.

INVENTORS.
GORDON B. SORLI and
SERGIO CALDERON
BY Peter Xiarhos
AGENT.

United States Patent Office 3,525,073

Patented Aug. 18, 1970

3,525,073

PARITY-CHECKING APPARATUS FOR CODED-VEHICLE IDENTIFICATION SYSTEMS

Sergio Calderon, Woburn, and Gordon B. Sorli, Burlington, Mass., assignors to Sylvania Electric Products Inc., a corporation of Delaware Filed Dec. 4, 1967, Ser. No. 687,823
Int. Cl. G06f *11/10;* G06k *5/00*
U.S. Cl. 340—146.1 6 Claims

ABSTRACT OF THE DISCLOSURE

Parity-checking apparatus for coded-vehicle identification systems. A retroreflective label affixed to a vehicle and coded to represent a plurality of digits $a_0 \ldots a_n$ and a parity check integer $R_C$ is scanned whereby signals representative of the label information are produced. The correctness of the information derived from the label is determined in accordance with a powers-of-two modulo-eleven system of parity expressed by $$\frac{a_0 2^0 + a_1 2^1 + \ldots a_n 2^n}{11} = I + \frac{R}{11}$$

by deriving a value for R and checking the value of R against the value of the parity check integer $R_C$. To derive a value for R, each of the signals representative of the digits $a_0 \ldots a_n$ are successively decoded and each decoded signal is applied to one of a plurality of AND gates in coincidence with a signal from a sequence counter. The outputs of the AND gates are coded to signals having predetermined values and the coded signals are summed in a base-11 adder. The value of the last sum produced by the adder represents the value for R.

BACKGROUND OF THE INVENTION

The present invention relates to parity-checking apparatus and, more particularly, to parity-checking apparatus for use in coded-vehicle identification systems.

In existing coded-vehicle identification systems it is often necessary or desirable to provide some means for verifying whether coded information has been correctly sensed from or transmitted by a vehicle, the identity of which is to be ascertained at a particular location. A wide variety of apparatus is presently available for determining the correctness of coded information received from a coded vehicle including parity-checking apparatus, pulse and binary digit counting apparatus, redundancy polling apparatus, and monitoring apparatus for recognizing codes of a predetermined format, for example, *m*-out-of-*n* codes.

The present invention is primarily concerned with parity-checking apparatus and, more particularly, with parity-checking apparatus for deriving the parity of multi-digit binary-coded signals in accordance with a parity system commonly known as the "powers-of-two modulo-eleven" system. Unlike the more conventional odd parity and even parity systems wherein the parity of a multi-digit coded message is determined from the number of binary "ones" or binary "zeros" in each coded digit, and unlike conventional Hamming code parity systems wherein parity is determined from an arrangement of several parity bits, the parity of a multi-digit binary-coded message is determined in accordance with the powers-of-two modulo-eleven system by multiplying the values of the binary-coded digits comprising the coded message by progressively increasing powers of two, summing the individual products, and dividing the sum by 11. The remainder resulting from division of the summed products by 11 represents the parity of the coded message. Mathematically, the powers-of-two modulo-eleven parity system may be expressed by the equation $$\frac{a_0 2^0 + a_1 2^1 \ldots + a_n 2^n}{11} = I + \frac{R}{11}$$

where $a_0 \ldots a_n$ represent the individual digits constituting the coded message, I is an integer representing the maximum number of times that the numerator $a_0 2^0 + \ldots + a_n 2^n$ is divisible by the denominator 11, and R is the remainder which represents the parity of the coded message.

The particular features of the powers-of-two modulo-eleven system that makes such a system attractive in a coded-vehicle identification system are that compensating errors or transpositional errors in a received coded message, comprising a plurality of digits, are readily detected. Consequently, more effective code verification may be achieved.

SUMMARY OF THE INVENTION

In accordance with the present invention, a coded-vehicle identification system is provided including a vehicle on which a coded label is disposed. The label is coded to represent a plurality of integers $a_0 \ldots a_n$, each of the integers $a_0 \ldots a_n$ having a given value, and a parity check integer having a value related to the values of the plurality of integer $a_0 \ldots a_n$ represented by the label.

In the operation of the invention, a plurality of signals representative of the plurality of integers $a_0 \ldots a_n$ and a parity signal representative of the parity check integer are acquired from the coded label by a suitable means. Each of the plurality of signals representative of the integers $a_0 \ldots a_n$ has a value corresponding to the value of the associated integer. The parity signal has a value corresponding to the value of the parity check integer. The plurality of signals representative of the integers $a_0 \ldots a_n$ are applied to a parity-derivation means and a value for the remainder R is derived from the plurality of signals in accordance with $$\frac{a_0 x^0 + a_1 x^1 + \ldots + a_n x^n}{K} = I + \frac{R}{K}$$

where $x$ and K are integers and I is an integer representing the maximum number of times that the numerator $a_0 x^0 + a_1 x^1 + \ldots + a_n x^n$ is divisible by K, and an output signal is produced by the parity-derivation means having a value equal to the value of R. For the powers-of-two modulo-eleven parity system discussed hereinabove, $x$ has a value of 2 and K has a value of 11.

To determine whether the plurality of signals representative of the integers $a_0 \ldots a_n$ and the parity signal representative of the parity check integer have been correctly acquired from the coded label, the value of the output signal from the parity-derivation means is checked in a circuit means against the value of the parity signal. If the values of the signals bear a predetermined relationship to each other, a first output condition is produced by the circuit means; if the values of the signals do not bear the predetermined relationship to each other, a second output condition is produced by the circuit means.

The parity-derivation means of the invention comprises a first means having a first plurality of ouptut conductor means associated therewith, each of the first plurality of output conductor means corresponding to one of the values of the plurality of signals representative of the plurality of integers $a_0 \ldots a_n$; a second means having a second plurality of output conductor means associated therewith; a translator means having a third plurality of output conductor means associated therewith; an encoder means having a plurality of input conductor means associated therewith connected to the third plurality of output conductor means; and an adder means.

In the operation of the parity-derivation means, each of the plurality of signals representative of the integers $a_0 \ldots a_n$ are applied in succession to the first means. In response to receiving each of the signals representative of the integers $a_0 \ldots a_n$, the corresponding ones of the first plurality of output conductor means are energized in succession by the first means. In response to the first means successively receiving each of the plurality of signals representative of the integers $a_0 \ldots a_n$ and energizing each corresponding one of the first plurality of output conductor means, each of the second plurality of output conductor means is energized in succession by the second means. A different one of the second plurality of output conductor means is energized for each energization of an output conductor means of the first plurality of output conductor means. The translator means operates to energize individual ones of the third plurality of output conductor means in response to the coincident energization of an output conductor means of the first plurality of output conductor means and an output conductor means of the second plurality of output conductor means.

The encoder means operates to encode a signal received by each of the plurality of input conductor means associated therewith from the output conductor means of the third plurality of output conductor means to a coded signal having a different value. The adder means operates to cumulatively add the values of coded signals applied thereto from the encoder means and further operates to subtract from any accumulated sum an amount equal to a predetermined quantity ("K" in the above equation) when the value of the accumulated sum equals or exceeds the predetermined quantity. The last sum produced by the adder means after processing the signal representative of the integer $a_n$ has a value equal to the value of R in the above equation.

CODED-VEHICLE IDENTIFICATION SYSTEM—FIG. 1

Figure 1:
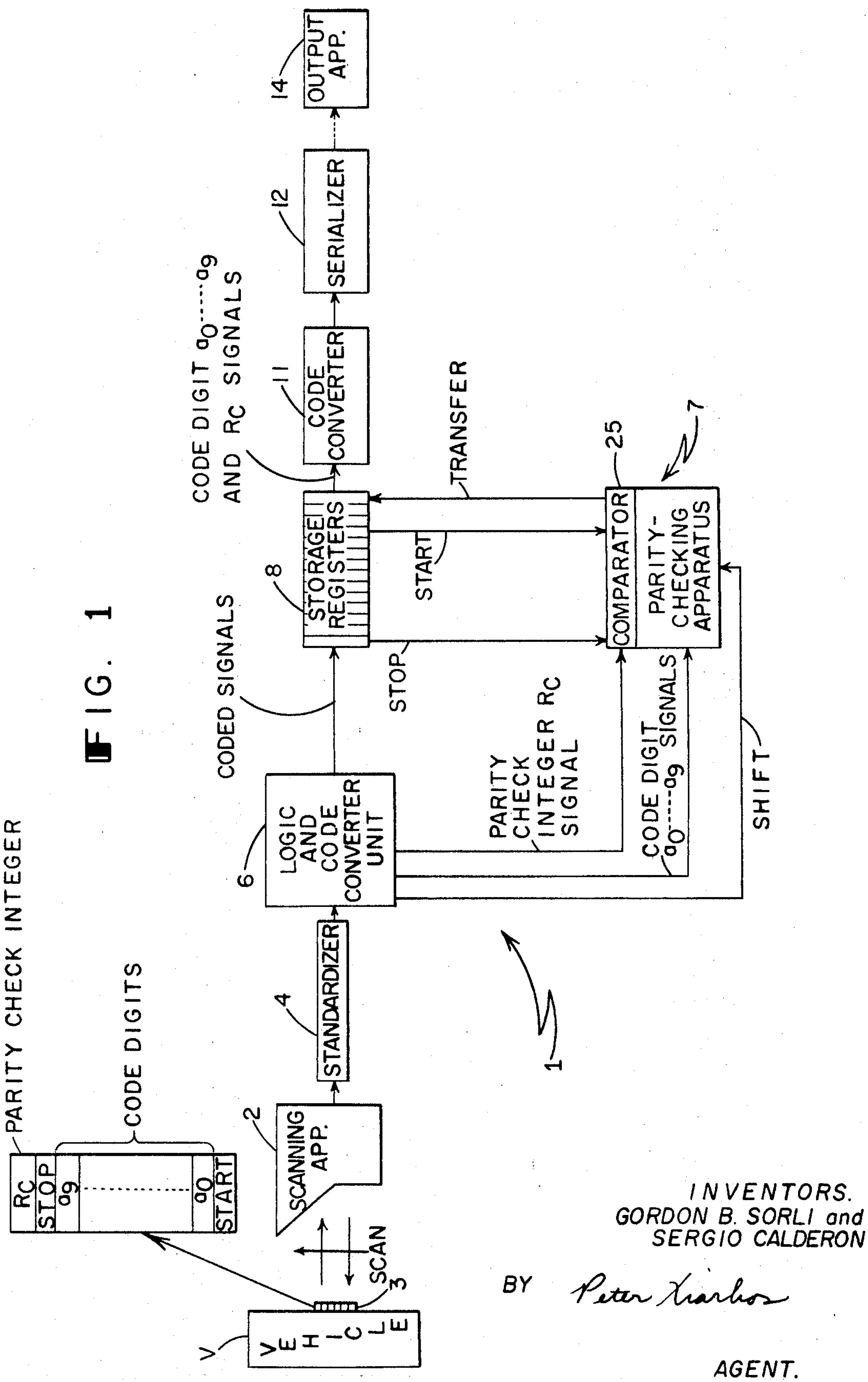
FIG. 1 is a schematic block diagram representation of a coded-vehicle identification system employing parity-checking apparatus in accordance with the invention.

Referring to FIG. 1, there is shown in a schematic block diagram form a coded-vehicle identification system 1 employing a parity-checking apparatus 7 in accordance with the invention. As shown in FIG. 1, the coded-vehicle identification system 1 includes a scanning apparatus 2 adapted to scan a coded label 3 affixed to a vehicle V and to produce signals representative of the code information on the label 3. A standardizer 4 connected to the scanning apparatus 2 operates to convert each of the signals from the scanning apparatus 2 into a signal having a standardized amplitude.

A logic and code converter unit 6 connected to the standardizer 4 operates to convert the standardized signals from the standardizer 4 into binary-coded signals, which binary-coded signals are then successively applied to and stored in a plurality of storage registers 8. Various ones of the binary-coded signals produced by the logic and code converter unit 6 are also applied in succession to the parity-checking apparatus 7 by means of SHIFT signals generated by the logic and code converter unit 6 and applied to the parity-checking apparatus 7.

The parity-checking apparatus 7, and a comparator 25 included therein, operate under control of signals from the logic and code converter unit 6 and from the plurality of storage registers 8 (START and STOP signals), to verify the correctness of the coded information derived from the label 3 by the scanning apparatus 2. More particularly, if the information derived from the coded label 3 is determined to be correct by the parity-checking apparatus 7, a TRANSFER signal is produced thereby and applied to the plurality of storage registers 8 to allow binary-coded signals stored in selected ones of the plurality of storage registers 8 to be transferred to a code converter 11. Otherwise, such transfer of the coded signals is prevented by the parity-checking apparatus 7. The code converter 11 serves to convert the binary-coded signals from the plurality of storage registers 8 into signals suitable for further processing. A serializer 12 connected to the code converter 11 translates the signals from the code converter 11 into a serial form, which signals in serial form are then applied to a suitable output apparatus 14.

The coded label 3 is preferably of a retroreflective type such as described in detail in U.S. Pat. No. 3,225,177 to Stites et al., assigned to the assignee of the present application. Briefly, the coded label 3 is fabricated from rectangular orange, blue, and white retroreflective stripes, and non-retroreflective black stripes. The orange, blue, and white retroreflective stripes have the capability of reflecting substantially all of an incident light beam back along the path of incidence. The black stripes effectively lack such a capability of retroreflection. The label 3 is suitably coded, for example, in a two-position base-four code, by various two-stripe combinations of the retroreflective orange, blue, and white stripes and the non-retroreflective black stripes, to represent in a sequential format blocks of information including a START control word, a plurality of digits $a_0$ through $a_9$, each having a decimal value selected from 0 . . . 9, a STOP control word, and a parity check integer $R_C$. The above-described format of the coded label information is shown in a blown-up pictorial form in FIG. 1. The rectangular label stripes are mounted in a vertical succession, each stripe having a horizontal orientation, on the side of the vehicle V. The decimal value of the parity check integer $R_C$ is determined from Equation 1 by substituting the particular decimal value 0 . . . 9 selected for each of the digits $a_0 \ldots a_9$ in Equation 1, and by performing the required arithmetic operations indicated in Equation 1 to solve for R.

The detailed manner of operation of the coded-vehicle identification system 1 of FIG. 1 is as follows. When the vehicle V bearing the coded retroreflective label 3 passes the scanning apparatus 2, the scanning apparatus 2 scans the multiple stripes of the label 3 and produces a plurality of pulse signals representative of the coded label information, that is, the START control word, the digits $a_0 \ldots a_9$ information, the STOP control word, and the parity check integer $R_C$ information. Although not shown in FIG. 1, the scanning apparatus 2 typically includes a source of light and a rotating drum having a plurality of mirrors mounted on its periphery. As the drum rotates, the mirrors cause a beam of light to vertically scan the coded label 3 from bottom to top, the light reflected from the label 3 being divided by a dichroic optical system (not shown) into orange and blue "channels" for application to respective sensors, the output pulse signals from which are applied to the standardizer 4. For additional or more specific details regarding the scanning apparatus 2, reference may be made to the above-cited patent to Stites et al.

The standardizer 4 may be of a type described in detail in U.S. Pat. No. 3,299,271 to Stites, also assigned to the assignee of the present application. The standardizer 4 operates to measure the widths at the half-amplitude points of the individual pulse signals received in succession from the scanning apparatus 2 as the retroreflective stripes of the coded label 3 are successively scanned, and to convert the pulse signals measured at the half-amplitude points into signals having a uniform, standardized amplitude.

The signals processed by the standardizer 4, representing the START control word, the digit $a_0 \ldots a_9$ information, the STOP control word, and the parity check integer $R_C$ information, are applied to the logic and code converter unit 6 wherein each block of information (in two-position base-four code) is converted to a binary-coded signal comprising four bits. The coded four-bit signals from the logic and code converter unit 6 are applied in succession to the plurality of storage registers 8, individual registers being used to store the four-bit codes representing the START control word, the digits $a_0 \ldots a_9$, the STOP control word, and the parity check integer $R_C$. Additionally, certain ones of the coded signals, namely, the coded signals representative of the digits $a_0 \ldots a_9$ and the parity check integer $R_C$, are also applied in succession to the parity-checking apparatus 7 by means of SHIFT signals generated by the logic and code converter unit 6. The coded signal representative of the parity check integer $R_C$ is specifically applied to the comparator 25 included in the parity-checking apparatus 7.

To determine the validity of the information derived from the coded label 3, that is, whether the information derived from the coded label 3 by the scanning apparatus 2 is correct, a signal representative of the coded START signal is received from one of the plurality of storage registers 8 and applied to the parity-checking apparatus 7 to initiate the operation thereof and the four-bit coded signals representative of the digits $a_0 \ldots a_9$ are then individually and successively applied by the logic and code converter unit 6 to the parity-checking apparatus 7 together with appropriate SHIFT signals from the logic and code converter unit 6. In response to the various signals applied thereto, the parity-checking apparatus 7 derives a value for the remainder R (parity) in accordance with Equation 1, and produces a four-bit coded signal representative thereof, said coded signal being designated by $R_C'$.

After the value of parity $R_C'$ corresponding to the values of $a_0 \ldots a_9$ is determined by the parity-checking apparatus 7, the coded four-bit signal representative of the parity check integer $R_C$ is applied by the logic and code converter unit 6 to the comparator 25 included in the parity-checking apparatus 7 together with the four-bit coded signal $R_C'$. Upon receiving a signal representative of the coded STOP signal from one of the plurality of storage registers 8, the two signals $R_C$ and $R_C'$ are compared in the comparator 25. If the two coded signals compare, thereby indicating that the information derived from the coded label 3 is correct, an output TRANSFER is signal is produced by the comparator 25 and applied to the storage registers 8 to transfer the coded signals representative of the digits $a_0 \ldots a_9$ and the parity check interger $R_C$ stored in the plurality of storage registers 8 out of the registers 8 and into the code converter 11. If the two coded signals in the comparator 25 do not compare, thereby indicating that the information derived from the coded label 3 is not correct, an output signal is produced by the comparator 25 preventing the transfer of the coded signals out of the plurality of storage registers 8. If desired, the output TRANSFER signal may be applied to the plurality of storage registers 8 such that only the coded signals representative of the digits $a_0 \ldots a_9$ are shifted out of the plurality of storage registers 8 into the code converter 11. The code converter 11 serves to convert the properly-received four-bit signals stored in the plurality of storage registers 8, as verified by the parity-checking apparatus 7, into any suitable code arrangement, for example, a five-level teletypewriter code. The serializer 12 converts the coded data from the code converter 11 into a serial train of pulses, which pulses are then applied via a direct communication line or other suitable communication link to appropriate local or remote output apparatus 14, for example, a computer, or printout devices.

Figure 2:
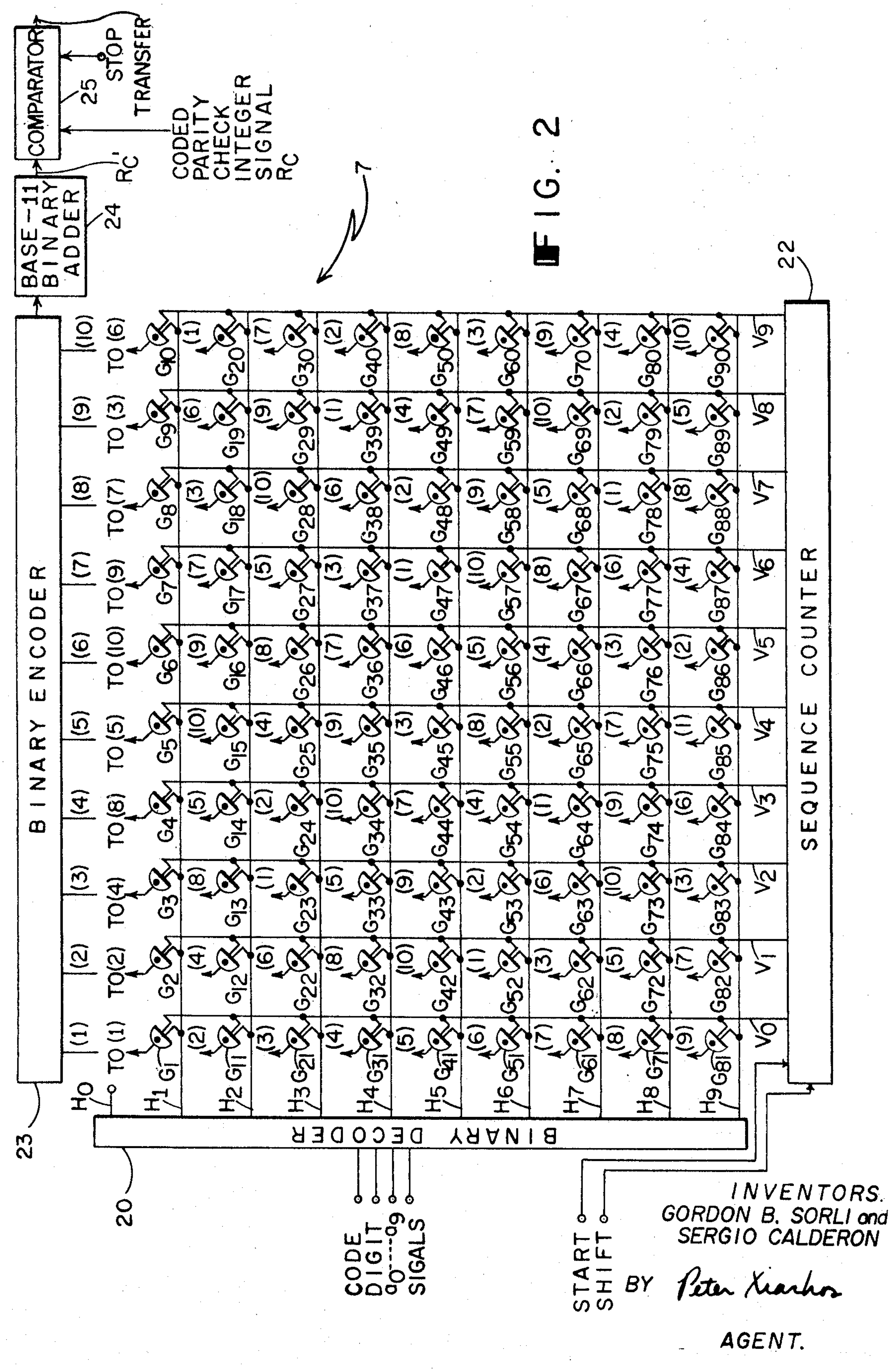
FIG. 2 is a more detailed showing of the parity-checking apparatus of FIG. 1.

The parity-checking apparatus 7 is shown is greater detail in FIG. 2. As shown therein, the parity-checking apparatus 7 comprises a binary decoder 20 having a plurality of horizontal output conductors $H_0 \ldots H_9$ associated therewith, a sequence counter 22 having a plurality of vertical output conductors $V_0 \ldots V_9$ associated therewith, a plurality of translator gates $G_1 \ldots G_{90}$, typically, AND gates, arranged at the crosspoints of the horizontal conductors $H_1 \ldots H_9$ and the vertical conductors $V_0 \ldots V_9$, a binary encoder 23 coupled to the outputs of the AND gates $G_1 \ldots G_{90}$ by means of a plurality of encoder input lines (1) . . . (10), a base-11 binary adder 24, and the comparator 25 connected to the base-11 binary adder. The manner in which the parity-checking apparatus 7 operates will now be described. For the sake of completeness and clarity of understanding, the operation of the parity-checking apparatus 7 will be described in connection with Equation 1.

It will be recalled that in accordance with the "powers-of-two modulo-eleven" system of parity, parity is determined by solving for the remainder R in Equation 1

$$\frac{a_0 2^0 + a_1 2^1 + \ldots + a_n 2^n}{11} = I + \frac{R}{11}$$

If a coded label including ten coded digits $a_0 \ldots a_9$ ($a_n = a_9$ in Equation 1) is employed as discussed hereinabove in connection with the coded-vehicle identification system 1 of FIG. 1, Equation 1 becomes $$\frac{a_0 2^0 + a_1 2^1 + a_2 2^2 + a_3 2^3 + a_4 2^4 + a_5 2^5 + a_6 2^6 + a_7 2^7 + a_8 2^8 + a_9 2^9}{11} = I + \frac{R}{11} \quad (2)$$

where $a_0 \ldots a_9$ represents the digits of the coded label 3, each having a value selected from $0 \ldots 9$, I is an integer representing the maximum number of times that the numerator $a_0 2^0 + \ldots + a_9 2^9$ is divisible by 11, and R is the remainder which represents the parity of the coded message comprising the digits $a_0 \ldots a_9$. Equation 2 may be alternatively expressed by $$\frac{a_0 2^0}{11} + \frac{a_1 2^1}{11} + \frac{a_2 2^2}{11} + \frac{a_3 2^3}{11} + \frac{a_4 2^4}{11} + \frac{a_5 2^5}{11} + \frac{a_6 2^6}{11} + \frac{a_7 2^7}{11} + \frac{a_8 2^8}{11} + \frac{a_9 2^9}{11} = I + \frac{R}{11} \quad (3)$$

Further, each of the individual expressions of the left side of Equation 3 may be expressed by:

$$\frac{a_0 2^0}{11} = I_0 + \frac{R_0}{11} \quad (4)$$

$$\frac{a_1 2^1}{11} = I_1 + \frac{R_1}{11} \quad (5)$$

$$\frac{a_2 2^2}{11} = I_2 + \frac{R_2}{11} \quad (6)$$

$$\frac{a_3 2^3}{11} = I_3 + \frac{R_3}{11} \quad (7)$$

$$\frac{a_4 2^4}{11} = I_4 + \frac{R_4}{11} \quad (8)$$

$$\frac{a_5 2^5}{11} = I_5 + \frac{R_5}{11} \quad (9)$$

$$\frac{a_6 2^6}{11} = I_6 + \frac{R_6}{11} \quad (10)$$

$$\frac{a_7 2^7}{11} = I_7 + \frac{R_7}{11} \quad (11)$$

$$\frac{a_8 2^8}{11} = I_8 + \frac{R_8}{11} \quad (12)$$

$$\frac{a_9 2^9}{11} = I_9 + \frac{R_9}{11} \quad (13)$$

When each of the digits $a_0 \ldots a_9$ is assigned a value of 0 to 9, the following table of values for the individual remainders $R_0 \ldots R_9$ may be derived:

| values of $a_0 \ldots a_9$ | $R_0$ ($a_0$) | $R_1$ ($a_1$) | $R_2$ ($a_2$) | $R_3$ ($a_3$) | $R_4$ ($a_4$) | $R_5$ ($a_5$) | $R_6$ ($a_6$) | $R_7$ ($a_7$) | $R_8$ ($a_8$) | $R_9$ ($a_9$) |
|---|---|---|---|---|---|---|---|---|---|---|
| 0 | 0 | 0 | 0 | 0 | 0 | 0 | 0 | 0 | 0 | 0 |
| 1 | 1 | 2 | 4 | 8 | 5 | 10 | 9 | 7 | 3 | 6 |
| 2 | 2 | 4 | 8 | 5 | 10 | 9 | 7 | 3 | 6 | 1 |
| 3 | 3 | 6 | 1 | 2 | 4 | 8 | 5 | 10 | 9 | 7 |
| 4 | 4 | 8 | 5 | 10 | 9 | 7 | 3 | 6 | 1 | 2 |
| 5 | 5 | 10 | 9 | 7 | 3 | 6 | 1 | 2 | 4 | 8 |
| 6 | 6 | 1 | 2 | 4 | 8 | 5 | 10 | 9 | 7 | 3 |
| 7 | 7 | 3 | 6 | 1 | 2 | 4 | 8 | 5 | 10 | 9 |
| 8 | 8 | 5 | 10 | 9 | 7 | 3 | 6 | 1 | 2 | 4 |
| 9 | 9 | 7 | 3 | 6 | 1 | 2 | 4 | 8 | 5 | 10 |

Referring again to FIG. 2, it may be noted from the numbers enclosed in parentheses (shown adjacent the output lines of the AND gates $G_1 \ldots G_{90}$), that each of the plurality of AND gates $G_1 \ldots G_{90}$ represents a value set forth in a corresponding position in the table, with the exception of the zero values which, as will become apparent hereinafter, have no affect on the operation of the parity-checking apparatus 7. Further, it may be noted that although the horizontal output conductor $H_0$ corresponding to zero values is provided, such output conductor is not utilized, and no gates G corresponding to zero values are utilized or required. Moreover, although not shown in FIG. 2 for the sake of simplicity, the output lines of all of the AND gates G corresponding to a given value in the table are joined together and then connected to the appropriate one of the input lines (1) . . . (10) of the binary encoder 23. For example, the output lines of the AND gates $G_1$, $G_{20}$, $G_{23}$, $G_{39}$, $G_{47}$, $G_{52}$, $G_{64}$, $G_{78}$, and $G_{85}$, corresponding to the value 1 in the table (shown hatched) are joined together and connected to the input line (1) of the binary encoder 23. Similarly, the output lines of all of the AND gates G corresponding to each of the values 2 through 10 of the table are joined together and connected to the corresponding input lines (2) . . . (10) of the binary encoder 23.

The binary encoder 23, typically a conventional diode matrix encoder, serves to code the output signal from each of the AND gates G and appearing on one of the input lines (1) . . . (10) into a binary signal corresponding to the particular value of $R_0 \ldots R_9$ represented by the gates. For example, the output signal of each of the AND gates $G_1$, $G_{20}$, $G_{23}$, $G_{39}$, $G_{47}$, $G_{52}$, $G_{64}$, $G_{78}$, and $G_{85}$ is encoded to 0001 (corresponding to a decimal value of 1) by the binary encoder 23. Similarly, the output signal of each of the AND gates $G_2$, $G_{11}$, $G_{24}$, $G_{40}$, $G_{48}$, $G_{53}$, $G_{65}$, $G_{79}$, and $G_{86}$, is encoded to 0010 (corresponding to a decimal value of 2) by the binary encoder 23, etc.

OPERATION OF PARITY-CHECKING APPARATUS 7—FIG. 2

The detailed manner of operation of the parity-checking apparatus 7 of FIG. 2 may now be described. The following values of the digits $a_0 \ldots a_9$ as received from the logic and code converter unit 6 will be arbitrarily assumed from which a decimal value of 3 for $R_C$ (labeled parity check integer) may be derived from Equation 1:

$a_0=4$
$a_1=7$
$a_2=3$
$a_3=1$
$a_4=5$
(Value of $R_C=3$ from Equation 1)
$a_5=5$
$a_6=9$
$a_7=8$
$a_8=9$
$a_9=2$ After the operation of the binary decoder 20 is initiated by a signal representative of the coded START signal, the coded signal representative of the first digit $a_0=4$ is applied by the logic and code converter unit 6, FIG. 1, to the binary decoder 20 and decoded to provide an output current signal to energize the fifth horizontal conductor $H_4$ corresponding to the value 4 of the first digit $a_0$. At the same time, a SHIFT signal from the logic and code converter unit 6 is also applied to the sequence counter 22 to cause an output current signal to be produced on the first vertical conductor $V_0$. In response to the signals coincidentally appearing on the horizontal conductor $H_4$ and the vertical conductor $V_0$, the AND gate $G_{31}$ produces an output signal which is applied to the input line 4 of the binary encoder 23. The binary encoder 23 converts the output signal of the AND gate $G_{31}$ into a binary-coded signal 01000 representing $R_0=4$, which binary-coded signal is then applied to the base-11 binary adder 24. The base-11 binary adder 24 is constructed to operate in base-11 whereby a quantity equal to 11 is automatically subtracted from the value of a coded signal applied thereto having a value equal to or greater than 11.

After the coded $R_0$ signal is applied to the binary adder 24, the coded signal representative of the second digit $a_1=7$ is applied to the binary decoder 20 by the logic and code converter unit 6 and, additionally, a second SHIFT signal is applied by the logic and code converter unit 6 to the sequence counter 22. In response thereto, the eighth horizontal conductor $H_7$ and the second vertical conductor $V_1$ are both energized, and an output signal is produced by the AND gate $G_{62}$ and applied to the input line (3) of the binary encoder 23. The output signal of the AND gate $G_{62}$ is encoded into a binary-coded signal 0011 representing $R_1=3$. The coded signal representing $R_1=3$ is added in the binary adder 24 to the previous binary-coded signal representing $R_0=4$ to yield a binary-coded signal in the binary adder 24 having a value of 7.

In the same manner as described hereinabove, the coded signals representative of the digits $a_2 \ldots a_9$ are applied in sequence to the binary decoder 20 and decoded thereby, to energize the appropriate ones of the horizontal conductors $H_1 \ldots H_9$, and SHIFT signals are applied to the sequence counter 22 to cause the sequence counter 22 to count in sequence whereby the vertical conductors $V_2 \ldots V_9$ are energized in sequence. Although the operation of the parity-checking apparatus 7 of FIG.

2 will not be described in detail for the remaining digits $a_2 \ldots a_9$, the following table, setting forth the particular AND gates G operated by current signals on the selected horizontal conductors $H_1 \ldots H_9$ and vertical conductors $V_2 \ldots V_9$, and the values of $R_2 \ldots R_9$ corresponding to the digits $a_2 \ldots a_9$, may be established.

| Digit | H | V | AND Gate | $R_2 \ldots R_9$ |
|---|---|---|---|---|
| $a_2=3$ | $H_3$ | $V_2$ | $G_{23}$ | $R_2=1$ |
| $a_3=1$ | $H_1$ | $V_3$ | $G_4$ | $R_3=8$ |
| $a_4=5$ | $H_5$ | $V_4$ | $G_{45}$ | $R_4=3$ |
| $a_5=5$ | $H_5$ | $V_5$ | $G_{46}$ | $R_5=6$ |
| $a_6=9$ | $H_9$ | $V_6$ | $G_{87}$ | $R_6=4$ |
| $a_7=8$ | $H_8$ | $V_7$ | $G_{78}$ | $R_7=1$ |
| $a_8=9$ | $H_9$ | $V_8$ | $G_{89}$ | $R_8=5$ |
| $a_9=2$ | $H_2$ | $V_9$ | $G_{20}$ | $R_9=1$ |

In the manner described hereinabove, the binary-coded signals representing $R_2 \ldots R_9$ are added in a cumulative fashion to the previous count in the binary adder 24. As stated previously, if at any time the count in the binary adder 24 equals or exceeds a value of 11, the binary adder 24 automatically subtracts 11 therefrom. Thus, in the above situation, the count in the binary adder 24 after processing the coded signal representative of the digit $a_1$, that is, a count of 7, is added to $R_2=1$ to yield 8. The count of 8 is then added to $R_3=8$ to yield 16. After the binary adder 24 subtracts 11 from the 16, a count of 5 is in the binary adder 24. The count of 5 is then added to $R_4=3$ to yield a count of 8. The count of 8 is added to $R_5=6$ to yield 14. After the binary adder 24 subtracts 11 from 14, a count of 3 is in the binary adder 24. The count of 3 is then added to $R_6=4$ to yield a count of 7. The count of 7 is added to $R_7=1$ to yield a count of 8. The count of 8 is added to $R_8=5$ to yield 13. After the binary adder 24 subtracts 11 from 13, a count of 2 is in the binary adder 24. The count of 2 is then added to $R_9=1$ to yield a count of 3. This count of 3, in binary form, corresponds to the value of parity R in Equation 1, that is, $R_C'$ (calculated) for the given values of $a_0 \ldots a_9$. It may be noted that no AND gates G corresponding to 0 values of $R_0 \ldots R_9$ in the first table are needed in the apparatus of FIG. 2 inasmuch as a count of 0 added to an existing count in the binary adder 24 has no effect on the existing count.

To verify the information derived from the coded label 3, the coded signal from the logic and code converter unit 6 representing the label parity-check integer information $R_C$ is applied to the comparator 25 by the logic and code converter unit 6 together with the binary-coded signal from the binary adder 24 representing $R_C'$ (calculated). Upon receiving a signal from one of the storage registers 8 representing the coded STOP signal, the two signals are compared in the comparator 25. If the two coded signals representing $R_C$ and $R_C'$ compare in value, an output TRANSFER signal is produced by the comparator 25 and applied to the plurality of storage registers 8 to transfer the coded signals stored therein representative of the digits $a_0 \ldots a_9$ and the parity check integer $R_C$ to the code converter 11 as previously described. If the two signals do not compare in value, the transfer of the coded signals from the plurality of storage registers is prevented by the comparator 25.

It will now be apparent that a coded-vehicle identification system has been disclosed in such full, clear, concise and exact terms as to enable any person skilled in the art to which it pertains to make and use the same. It will also be apparent that various changes and modifications may be made in form and detail by those skilled in the art without departing from the spirit and scope of the invention. Therefore, it is intended that the invention shall not be limited except as by the appended claims.

What is claimed is:

1. In a coded-vehicle identification system including a vehicle on which a coded retroreflective label is disposed, said label being coded to represent $m$ integers $a_0 \ldots a_n$, each of the $m$ integers having a given value, said value including 0; and a parity check integer $R_C$ having a value related to the values of the $m$ integers $a_0 \ldots a_n$, apparatus comprising:

means adapted to acquire from said coded retroreflective label $m$ coded signals representative of the $m$ integers $a_0 \ldots a_n$, each of said $m$ coded signals having a value corresponding to the value of the associated integer, and a coded parity signal representative of the parity check integer $R_C'$ said coded parity signal having a value corresponding to the value of the parity check integer; and parity-checking apparatus comprising:

parity-derivation means operable to receive the plurality $m$ of coded signals representative of the plurality $m$ of integers $a_0 \ldots a_n$ and to derive therefrom a value for the remainder R in accordance with $$\frac{a_0x^0+a_1x^1+\ldots a_nx^n}{K}=I+\frac{R}{K}$$

where $x$ and K are integers and I is an integer representing the maximum number of times that the numerator $a_0x^0+a_1x^1+\ldots a_nx^n$ is divisible by K, and to produce an output signal having a value equal to the valve of R, said parity-derivation means comprising (a) decoder means having a plurality of decoder output conductor means associated therewith corresponding to the values of the $m$ coded signals representative of the $m$ integers, the number of output conductor means in said plurality of decoder output conductor means being equal to the number of values of the $m$ coded signals representative of the $m$ integers, said decoder means being operable to receive in succession each of said $m$ coded signals representative of the $m$ integers $a_0 \ldots a_n$ and to decode each of said signals and to energize the ones of said plurality of decoder output conductor means corresponding to the values of the $m$ signals representative of the $m$ integers $a_0 \ldots a_n$;

(b) counter means having a plurality of counter output conductor means associated therewith, the number of counter output conductor means being equal to $m$, each of said $m$ output conductor means corresponding to one of said $m$ coded signals representative of one of the $m$ integers $a_0 \ldots a_n$, said counter means being operable in response to said decoder means successively operating on each of the coded signals representative of the $m$ integers $a_0 \ldots a_n$, to successively energize the corresponding ones of said $m$ counter output conductor means;

(c) $m$ groups of AND gate means, the AND gate means in a given group each having a first input terminal connected to a different one of said plurality of decoder output conductor means, said different one of said plurality of decoder output conductor means excluding the one of said plurality of decoder output conductor means corresponding to a 0 value of one of said $m$ signals representative of the $m$ integers $a_0 \ldots a_n$, a second input terminal connected in common to one of said plurality of $m$ counter output conductor means, the second input terminals associated with each group of AND gate means being connected to a different one of the plurality of $m$ counter output conductor means, and an output terminal, each of said AND gate means being operable to produce an output signal at its associated output terminal in response to an associated one of said plurality of of decoder output conductor means and and an associated one of said plurality of counter output conductor means being coincidently energized by said decoder means and said counter means, respectively;

(d) encoder means having a plurality of $m$ encoder input conductor means associated therewith, each of said plurality of $m$ encoder input conductor means being connected to the output terminals of a set of said AND gate means, the number in each set of AND gate means being equal to one less than the number of output conductor means in said plurality of decorder output conductor means, said encoder means being operable to encode a signal from an AND gate means received by each of the plurality of $m$ encoder input conductor means to a coded signal having a given, different value; and (e) adder means coupled to said encoder means and operable to cumulatively add the values of the coded signals applied thereto in succession from said encoder means, said adder means being further operable to subtract from any accumulated sum an amount equal to K when the value of the accumulated sum equals or exceeds K; and circuit means operable to check the value of the last sum produced by said adder means, representing a value for R, against the value of the coded parity signal representative of the parity check integer $R_C$ and to produce a first output condition if the values of the last sum and the parity signal are equal, or to produce a second output condition if the values of the last sum and the parity signal are not equal.

2. Apparatus in accordance with claim 1 wherein:

each set of AND gate means comprises one AND gate means from each of the $m$ groups of AND gate means.

3. Apparatus in accordance with claim 1 wherein the value of each of the $m$ integers $a_0 \ldots a_n$ is selected from $0 \ldots 9$; the parity check integer $R_C$ has a value of $0 \ldots 10$; said coded signals from said encoder means have values of $1 \ldots 10$; and K has a value of 11.

4. Apparatus in accordance with claim 3 wherein:

the number of decoder output conductor means of the decoder means is equal to 10;

the number of counter output conductor means of the counter means is equal to 10; and the AND gate means are connected to the plurality of decoder output conductor means of the decoder means, excepting the decoder output conductor means corresponding to a 0 value of a signal representative of one of the integers $a_0 \ldots a_n$, and to the plurality of counter output conductor means of the counter means in a matrix having 9 rows and 10 columns, the AND gate means representing the values set forth in the following table:

| | | | | | | | | | |
|---|---|---|---|---|---|---|---|---|---|
| 1 | 2 | 4 | 8 | 5 | 10 | 9 | 7 | 3 | 6 |
| 2 | 4 | 8 | 5 | 10 | 9 | 7 | 3 | 6 | 1 |
| 3 | 6 | 1 | 2 | 4 | 8 | 5 | 10 | 9 | 7 |
| 4 | 8 | 5 | 10 | 9 | 7 | 3 | 6 | 1 | 2 |
| 5 | 10 | 9 | 7 | 3 | 6 | 1 | 2 | 4 | 8 |
| 6 | 1 | 2 | 4 | 8 | 5 | 10 | 9 | 7 | 3 |
| 7 | 3 | 6 | 1 | 2 | 4 | 8 | 5 | 10 | 9 |
| 8 | 5 | 10 | 9 | 7 | 3 | 6 | 1 | 2 | 4 |
| 9 | 7 | 3 | 6 | 1 | 2 | 4 | 8 | 5 | 10 |

a first one of the encoder input conductor means being connected to all of the output terminals of the AND gate means representing the values 1, a second one of the encoder input conductor means being connected to all of the output terminals of the AND gate means representing the values 2, and so forth.

5. Apparatus in accordance with claim 3 wherein said circuit means is a comparator means:

said apparatus further comprising a plurality of data storage means adapted to receive and to retain the plurality $m$ of coded signals representative of the $m$ integers $a_0 \ldots a_n$ and to receive said first and second output conditions from said comparator means, said plurality of data storage means being operable to transfer therefrom said plurality $m$ of coded signals representative of the $m$ integers $a_0 \ldots a_n$ in response to receiving said first output condition.

6. Apparatus in accordance with claim 5 further comprising:

code conversion means operable to convert the plurality of coded signals representative of the $m$ integers transferred from said plurality of data storage means into coded signals having a different code form; and serializer means coupled to said code conversion means for translating the coded signals from the code conversion means into a serial form.

References Cited

UNITED STATES PATENTS

| | | | |
|---|---|---|---|
| 2,886,240 | 5/1959 | Linsman | 235—153 |
| 3,098,994 | 7/1963 | Brown | 340—146.1 |
| 3,183,482 | 5/1965 | Aberth et al. | 340—146.1 |
| 3,384,902 | 5/1968 | Schroder et al. | 340—146.1 |
| 3,417,231 | 12/1968 | Stites et al. | 235—61.11 |

MALCOLM A. MORRISON, Primary Examiner

C. E. ATKINSON, Assistant Examiner

U.S. Cl. X.R.

235—61.11, 153

PO-1050
(5/69)

UNITED STATES PATENT OFFICE
CERTIFICATE OF CORRECTION

Patent No. 3,525,073 Dated August 18, 1970

Inventor(s) Sergio Calderon and Gordon B. Sorli

It is certified that error appears in the above-identified patent and that said Letters Patent are hereby corrected as shown below:

Column 12, the table set forth therein should be

| | | | | | | | | | |
|---|---|---|---|---|---|---|---|---|---|
| 1 | 2 | 4 | 8 | 5 | 10 | 9 | 7 | 3 | 6 |
| 2 | 4 | 8 | 5 | 10 | 9 | 7 | 3 | 6 | 1 |
| 3 | 6 | 1 | 2 | 4 | 8 | 5 | 10 | 9 | 7 |
| 4 | 8 | 5 | 10 | 9 | 7 | 3 | 6 | 1 | 2 |
| 5 | 10 | 9 | 7 | 3 | 6 | 1 | 2 | 4 | 8 |
| 6 | 1 | 2 | 4 | 8 | 5 | 10 | 9 | 7 | 3 |
| 7 | 3 | 6 | 1 | 2 | 4 | 8 | 5 | 10 | 9 |
| 8 | 5 | 10 | 9 | 7 | 3 | 6 | 1 | 2 | 4 |
| 9 | 7 | 3 | 6 | 1 | 2 | 4 | 8 | 5 | 10 |

SIGNED AND
SEALED
NOV 17 1970

(SEAL)
Attest:

Edward M. Fletcher, Jr.
Attesting Officer

WILLIAM E. SCHUYLER, JR.
Commissioner of Patents